Oct. 20, 1936.  G. B. RANDOLPH  2,058,353
MOBILE LAWN TRIMMER
Filed June 24, 1935  2 Sheets-Sheet 1

Inventor
George B. Randolph
By Geo. P. Kimmel
Attorney

Oct. 20, 1936.  G. B. RANDOLPH  2,058,353
MOBILE LAWN TRIMMER
Filed June 24, 1935  2 Sheets-Sheet 2
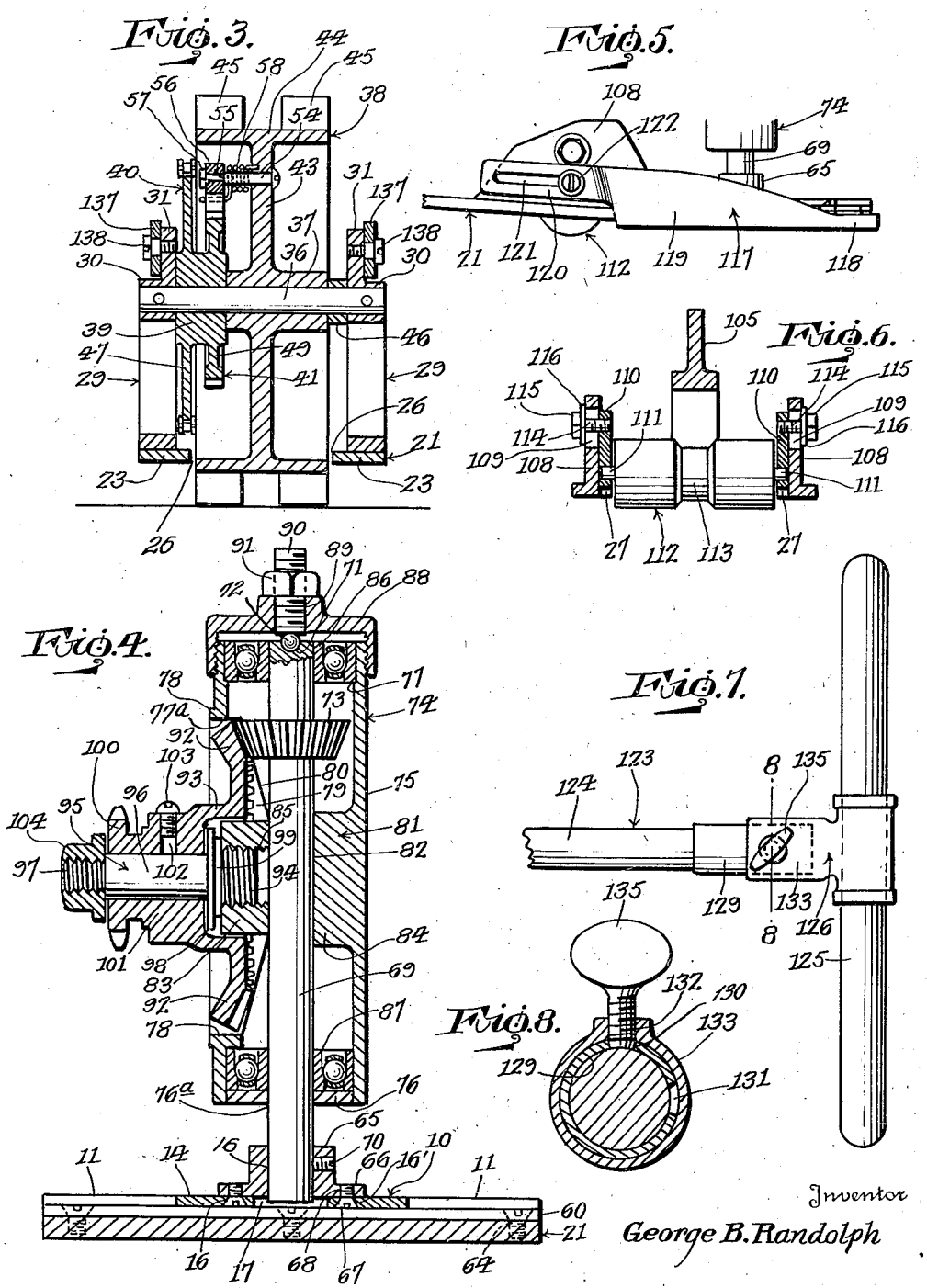
Inventor
George B. Randolph
By Geo. P. Kimmel
Attorney Patented Oct. 20, 1936

2,058,353

UNITED STATES PATENT OFFICE 2,058,353

MOBILE LAWN TRIMMER

George B. Randolph, San Antonio, Tex.

Application June 24, 1935, Serial No. 28,170

7 Claims. (Cl. 56—255)

This invention relates to a mobile lawn trimmer and has for its object to provide, in a manner as hereinafter set forth, a device of the class referred to including rotatable non-gripping and gripping traction elements arranged in alignment for maintaining the trimming means of the device, during the operation of the latter at a point with respect to the ground to provide for the uniform clipping or trimming of the lawn.

A further object of the invention is to provide, in a manner as hereinafter set forth, a device of the class referred to including a cutter element, a driving means for the latter and operating means for said driving means automatically connecting with the driving means on the forward travel of the device to operate the cutter element and automatically disconnecting from said driving means on the rearward travel of the device for the purpose of discontinuing the operation of the cutter element.

A further object of the invention is to provide, in a manner as hereinafter set forth, a device of the class referred to including a cutter element and means for compensating for wear of the cutter element and for permanently maintaining the latter in close proximity to a cutter bar forming on a part of the device.

A further object of the invention is to provide, in a manner as hereinafter set forth, a device of the class referred to including a vertically adjustable traction means for varying the distance of the cutting means thereof in relation to the ground to enable for clipping or trimming at selective levels.

A further object of the invention is to provide, in a manner as hereinafter set forth, a device of the class referred to with a cutter element operated shaft protectively housed for the major portion of its length and having associated therewith and within the housing therefor, superposed bearing structures to provide for a non-retarded operation of the shaft from a driving means therefor.

A further object of the invention is to provide, in a manner as hereinafter set forth, a device for the purpose referred to including a traction wheel therefor having its tread formed with spaced rows of circumferentially extending spaced ground grippers.

A further object of the invention is to provide, in a manner as hereinafter set forth, a device of the class referred to including a combined bracing and sustaining means for the protecting housing for the cutter element shaft.

A further object of the invention is to provide, in a manner as hereinafter set forth, a mobile device of the class referred to for expeditiously and satisfactorily trimming a lawn.

Further objects of the invention are to provide, in a manner as hereinafter set forth, a lawn trimmer which is simple in its construction and arrangement, strong, durable, compact, tiltable, adjustable, thoroughly efficient in its use, readily assembled, expeditiously repaired when required, of a form to permit of the convenient substitution of a new part for an impaired one without discarding the other parts of the device, and comparatively inexpensive to manufacture.

With the foregoing and other objects which may hereinafter appear, the invention consists of the novel construction, combination and arrangement of parts as will be more specifically referred to and as are illustrated in the accompanying drawings, wherein is shown an embodiment of the invention, but it is to be understood that changes, variations and modifications may be resorted to which fall within the scope of the invention as claimed.

In the drawings:

Figure 3 is a section on line 3—3, Figure 1,

Figure 4 is a section on line 4—4, Figure 1,

Figure 5 is a fragmentary view in side elevation illustrating the flexible guard element, Figure 6 is a section on line 6—6, Figure 1, Figure 7 is a fragmentary view in top plan of the handle element, Figure 8 is a section on line 8—8, Figure 7.

Figure 1:
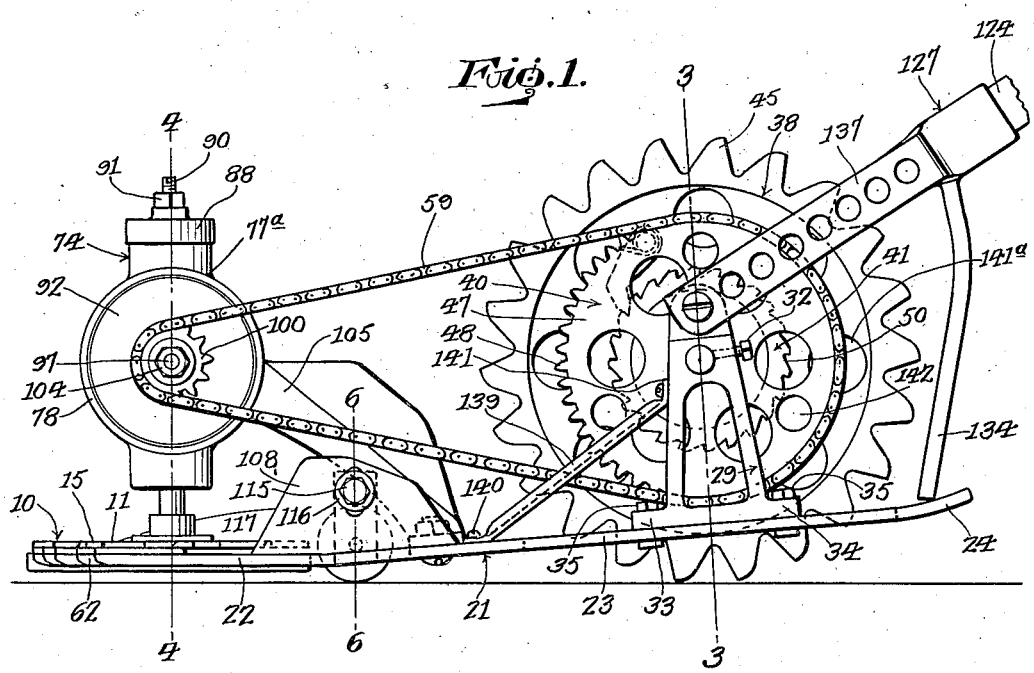
Figure 1 is a side elevation of the lawn trimmer.
Figure 2:
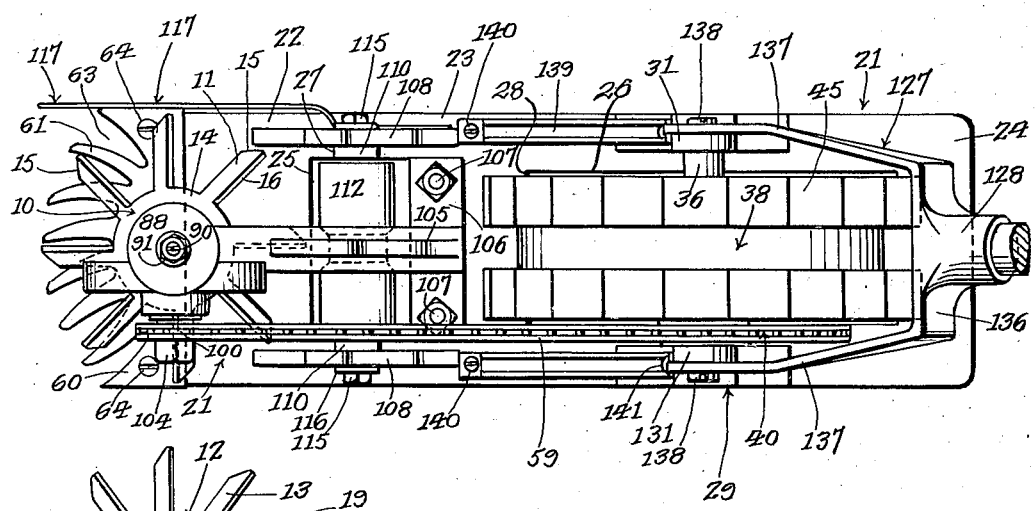
Figure 2 is a top plan view thereof.
Figure 9:
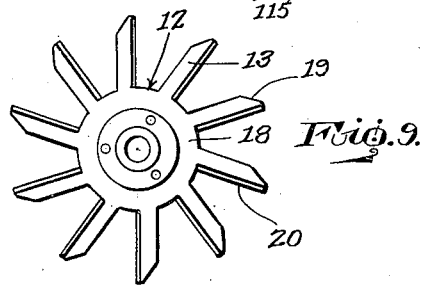
Figure 9 is a top plan view of a modified form of cutter element.

The device includes a horizontally revoluble cutter element associated with a cutter bar. In Figures 1, 2, and 4 the cutter element is designated 10 and is of a form provided with eight radially disposed spaced cutting blades 11. The cutter element may be of a form to have ten blades, and such form is indicated at 12 (Figure 9). The ten blades of element 12 are designated 13.

The element 10, as well as the element 12, is of circular form and consists of an annular inner part having extending from its outer edge the radially disposed cutting blades which have beveled outer ends and cutting edges coextensive with the leading side edges thereof. The said annular inner parts form the elements 10, 12 with axial openings. With reference to Figures 1, 2, and 4, the inner part, beveled outer ends of the blades, cutting edges of the blades and the axial opening of element 10 are indicated respectively at 14, 15, 16, and 17. The part 14 of element 10 in proximity to its inner edge is formed with a pair of diametrically disposed vertical tapered openings 16'.

The inner part of element 12 is constructed in the same manner as the inner part of element 10 and with reference to Figure 9, the inner part, beveled outer ends of the blades, and cutting edge of the blades of element 12 are indicated respectively at 18, 19, and 20.

The blades 11 and 13 from their followed side edges to their leading side edges incline slightly downward relative to the outer edges of the annular parts 14, 18, respectively.

The device includes an oblong base plate 21 formed of a straight front portion 22 and a rear portion 23 which extends at an upward inclination from portion 22. The portion 23 is of greater length than portion 22 and has an upwardly curved rear end 24. The portion 23 is formed transversely thereof with a rectangular front opening 25 (Figure 2) arranged in proximity to portion 22 and lengthwise thereof with an elongated rectangular rear opening 26 (Figure 2) having the forward end spaced rearwardly of the rear side of opening 25. The portion 23 is provided with a pair of oppositely extending cutouts 27 which communicate with the opening 25 centrally of the ends of the latter.

Secured to the side marginal portions of the upper face of portion 23 and spaced from the side walls 28 of the opening 26 is a pair of spaced upstanding parallel oppositely disposed tapered supports 29, of like form provided near their upper ends with bearings 30 and vertical apertured arms 31 at the inner ends of the top of the bearings 30. The supports 29 carry binding screws 32 for extension into the bearings 30. The supports 29 are oppositely flanged at their lower ends, as at 33, 34 for the passage of holdfast means 35 to anchor the supports 29 stationary upon base plate 21. Mounted in the bearings 30 are the ends of a supporting shaft 36 which is common to the hub 37 of a traction wheel 38 and to a hub 39 which is common to a sprocket wheel 40 and a ratchet wheel 41. The shaft 36 is retained stationary with respect to supports 29 by the binding screws 32. The wheel 38 is of greater diameter than the wheels 40, 41 and includes a circular web 43, a rim 44 and a pair of spaced parallel rows 45 of spaced grippers integral with the outer face of rim 44. The grippers of each row are disposed throughout the outer circumference of rim 44. The outer sides of the grippers of the rows are flush with the edges of rim 44. The hubs 37, 39 are arranged in endwise opposed alignments. The web 43 is integral with the center of the inner face of rim 44 and is also integral with hub 37 in proximity to that end of the latter which opposes the inner end of hub 39. The length of hub 37 is less than the cross sectional length of the body of rim 44. The other end of hub 37 is flush with an edge of rim 44. Mounted on shaft 36 and interposed between the hub 37 and one of the supports 29 is a spacing collar 46. The outer end of hub 39 abuts the other support 29. The wheel 40 is of greater diameter than wheel 41 and it includes a circular web 47 adjacent the outer end of and integral with hub 39. The web 47 has its outer edge in the form of sprocket teeth 48. The wheel 41 includes a circular web 49 adjacent the inner end of and integral with hub 39. The web 49 has its outer edge in the form of ratchet teeth 50. Fixed to web 43 and disposed at right angles thereto is a stub shaft 54 having a shoulder 55 adjacent its outer end. Positioned on shaft 54 between the outer end of the latter and shoulder 55 is a depending pivoted dog or pawl 56 for engagement with the teeth 50. A retaining means 57 for pawl 56 is secured to the other end of shaft 54. Anchored at one end to web 43, surrounding shaft 54 and anchored at its other end to pawl 56 is a controlling spring 58 for the latter. This spring functions to permanently provide for maintaining the pawl in engagement with the teeth 50. The pawl 56 functions to couple ratchet wheel 41 with wheel 38 to provide for the driving of sprocket wheel 40 on the anti-clockwise or forward travel of wheel 38. When wheel 38 travels clockwise, that is to say, when the trimmer moves rearwardly, the pawl 56 freely travels over the teeth 50 without coupling wheel 41 to wheel 40. The arrangement of the pawl 56 with respect to wheels 38, 41 provides for the automatic driving of the wheel 41 when the device is active and for the discontinuing of the drive of wheel 41 when the device is inactive. Driven from the sprocket wheel 40 is an endless power transmitting belt 59 of the link type employed for driving the actuating means for the cutter element when the wheel 38 travels in an anti-clockwise direction over the lawn to be trimmed.

Secured upon and of less length than the portion 22 of base plate 21 is a cutter bar 60 formed at its front part with curved fingers or teeth 61. The forward end of bar 60 is flush with the forward end of base plate 21. The latter at its forward part is formed with cutouts 62 having their edges flush throughout with the edges of the gullets 63 between the fingers or teeth 61. Holdfast means 64 are employd for anchoring bar 60 to plate 21.

The actuating means or mechanism for the cutter element consists of a vertical collar 65 formed at its lower end with an annular flange 66. The collar 65 at its bottom extends across the axial opening 17 of the cutter element. In Figures 1, 2, and 4 the collar 65 is shown as seated upon the part 14 of cutter element 10. The flange 66 is anchored to said part 14 by holdfast devices 67 extending upwardly through openings 16 and threadedly engaging with the threaded walls of openings 68 formed in flange 66. The cutter element 10 revolves directly upon the cutter bar 60. Extending into collar 65 is the lower end of a vertically disposed operating shaft 69 for the cutter element 10. The shaft 69 is anchored to collar 65 by a binding screw 70. The shaft 69 at its upper end is formed with an axially arranged cavity 71 in which is seated and extended therefrom a ball bearing 72. Fixed to the shaft 69 between its transverse median and its upper end is a bevel gear 73.

The major portion of the length of the shaft 69 is arranged within a vertically disposed suspended housing 74 which extends from a point above the upper end of shaft 69 to a point in proximity to the upper end of collar 65. The housing 74 includes a tubular body part 75 having its bottom closed by a plate 76 formed with an axial opening 76a. The plate 76 is suitably fixed to body part 75. The latter, in proximity to its upper end has its inner face formed with an annular shoulder 77. The body part 75 at one side is cutout, as at 77a and integral with the edges of the cutout is an upstanding annular member 78 provided at its end with a circular web 79 formed with a vertically disposed cutout 80 to provide a clearance. Integral with the inner face of the other side of body part 75 is a diametrically disposed cylindrical arm 81 which extends through cutout 80 into the member 78. The arm 81 has a vertical opening 82 for the passage of shaft 69. The outer portion 83 of arm 81 is of less diameter than the inner portion 84 of the latter and it is of tubular form provided with internal threads 85.

Mounted within the body part 75, supported by shoulder 77 and encompassing the upper end of shaft 69 is a roller bearing structure 86. Supported by the plate 76 and encompassing shaft 69 is a roller bearing structure 87 retained in position by the lower part of member 78. The upper of body part 75 is closed by a cap 88 which engages with peripheral threads on body part 75. The cap 88 is formed with an axial threaded opening 89 for an adjusting screw 90 which bears upon the ball 72. The screw 90 carries a clamping nut 91 for retaining screw 90 in adjusted position. The screw 90 in connection with the ball 72 forms a wear take-up device for the cutter element, as the lower face of the latter wears off the screw 90 may be adjusted to prevent any vertical movement of shaft 69. The screw 90 and ball 72 provide means to maintain the cutter element in contact with the upper face of cutter bar 60.

The actuating or driving means for shaft 69 consists of in connection with the gear 73 an enlarged crown gear 92 of the beveled type which meshes with and drives the gear 73. The gear 92 includes an outwardly directed tubular hub 93 of an inner diameter to surround in spaced relation and of a length to extend outwardly from the portion 83 of arm 81. Extending into and threadedly engaging with the said portion 83 is the enlarged peripherally threaded inner end portion 94 of a shaft 95. The latter is also formed with a plain portion 96, a peripherally threaded reduced outer end portion 97 and a pair of intermediate narrow portions 98, 99 constituting inner and outer stop flanges respectively. The portion 98 is of greater diameter than the other portions of the shaft. The portion 99 is of greater diameter than shaft portions 94, 96, and 97. The shaft portion 94 is of greater diameter than shaft portions 96, 97. The shaft portion 96 is of greater length than that of the other shaft portions. The shaft portion 98 is interposed between the inner end of shaft 96 and the shaft portion 99. The latter is interposed between shaft portions 94 and 98 and abuts the outer end of portion 83 of arm 81. Mounted on the outer end of shaft portion 96 is a sprocket pinion 100 which engages in the link belt 50. The pinion 100 is formed with an inwardly extending hub 101 seated on shaft portion 96 and merging into the outer end of the hub 93 of gear 92. The shaft portion 98 opposes the inner end of hub 101. The latter has a lubricant opening 102 normally closed by a removable plug 103. Secured upon shaft portion 97 is a cap member 104 of greater diameter than shaft portion 96. The member 104 and shaft portion 98 coact to retain the pinion 100 and hub 101 on shaft portion 96. The gear 92 is arranged within member 78 and substantially closes the latter.

The housing 75 is suspended by a rearwardly extending downwardly inclined suspension arm 105 which is integral at the upper end with the rear side of housing 75, one side of the outer face of the web 79 and one side of member 78 and has its lower end mounted on plate 21 between openings 25, 26. The lower end of arm 105 is formed with a pair of oppositely extending flanges 106 through which extend holdfast devices 107 for anchoring arm 105 to plate 21.

The device includes means for adjusting the portion 22 of plate 21 at varying distances above the ground for regulating the height of the cut by the cutting element. The said means includes a pair of spaced parallel upstanding supports 108 (Figure 6) which are integral with the plate 21 outwardly adjacent the cutouts 27 at the sides or ends of the opening 25. The supports 28 are formed with vertically disposed aligning slots 109. Positioned against the inner faces of the supports 108 are vertically adjustable hangers 110 having the ends of a shaft 111 journaled therein. The shaft 111 carries a traction element 112 having its tread formed with a reduced central portion 113 to provide a clearance for the suspension arm 105. The element 112 also acts to maintain the forward portion of plate 21 suspended above the ground. The hangers 110 are maintained in their adjusted position by releasable binding screws 114 threadedly engaging in the upper portions thereof, extending through the slots 109 and having their heads 115 binding washers 116 against the outer sides of the supports 108. The washers 116 are mounted on the screws 114 between the heads 115 and supports 108.

The device includes a flexible adjustable guard and directing member 117 which is arranged at one side of the cutter bar 60 and the forward side edge of plate 21 (Figures 1 and 5). The member 117 has a narrow rectangular forward part 118, a substantially triangular shaped intermediate part 119 of greater height than part 118 and an inset slotted rear part 120 of less height than and arranged above the bottom edge of part 119. The slot in part 120 is designated 121. The member 117 is lengthwise adjustable relative to plate 21, and it is fixed in its adjusted position by a binding screw 122 which extends through slot 121 and engaged in a support 108. The member 117 when the machine is active tends to direct the material to be cut at the right side of the path of travel towards the plate 21 and also prevents a person from being cut by the cutter element from the right side of the path of travel of the device when the latter is active.

The device includes a handle element 123 formed of a bar 124, a handle 125 carried by a T-coupling 126, a bail 127 pivotally connected with supports 129 having a socket 128 in which the lower end of bar 124 is anchored, a sleeve 129 on the outer end of bar 124 formed with a pair of openings 130, 131 (Figure 8) disposed at right angles to each other, a threaded opening 132 in the leg 133 of coupling 126, a combined stop and tilting rod 134, and a binding screw 135 carried by leg 133. The latter has extended therein the sleeve 129. The openings 130, 131 are to selectively receive the inner end of screw 135. The apertured sleeve 129 and screw 135 permit of selectively positioning and securing the handle 125 with respect to the lengthwise and horizontal medians of the bar 124 whereby the handle may be disposed in an upstanding or in a horizontal position. The rod 134 is integral with and depends from the closed upper end 136 of the bail 127. The rod 134 is directed to the upturned part or portion 24 of the plate 21 and coacts with said part 24 for arresting the lowering movement of the element 123, as well as coacting with part 24 for the purpose of tilting the machine on wheel 38 which extends through opening 26. The arms of bail 127 are designated 137 and which are mounted on headed pivots 138 (Figure 3) secured to the arms 31 at the upper ends of supports 29. These latter are braced by inclined stay members 139 anchored as at 140 to plate 21 and as at 141 to the supports 29. The webs of the wheels 38 and 40 are perforated as at 141a, 142 respectively, to reduce the weight thereof.

What I claim is:

1. In a mobile lawn trimmer, an oblong base plate formed with a forward and a rear opening and cutouts opening at its forward end disposed lengthwise thereof, a cutter bar anchored upon said plate provided with curved teeth having their edges flush with the edges of said cutouts, a vertically adjustable cut regulating unit adjustably connected with said plate and including a rotatable traction member depending through said front opening, a rotatable traction unit operating through said rear opening and including a horizontal shaft rotatably connected with said plate, a horizontally rotatable cutter positioned upon said cutter bar, a vertically disposed operating shaft for said cutter carrying intermediate its ends a gear, a bearing structure for and encompassing said shaft and provided with a suspension arm anchored to said plate, driving means for and meshing with the gear of said vertical shaft, said driving means connected to and extended laterally from said structure, operating means for said driving means operated from said traction unit revolubly mounted at one end on said horizontal shaft and having a driving connection at its other end for said driving means, and the said operating means and traction unit having coacting parts to provide for the operation of said operating means by and on the anticlockwise movement of the traction unit.

2. In a mobile lawn trimmer, an oblong base plate formed with a forward and a rear opening and cutouts opening at its forward end disposed lengthwise thereof, a cutter bar anchored upon said plate provided with curved teeth having their edges flush with the edges of said cutouts, a vertically adjustable cut regulating unit adjustably connected with said plate and including a rotatable traction member depending through said front opening, a rotatable traction unit operating through said rear opening and including a horizontal shaft rotatably connected with said plate, a horizontally rotatable cutter positioned upon said cutter bar, a vertically disposed operating shaft for said cutter carrying intermediate its ends a gear, a bearing structure for and encompassing said shaft and provided with a suspension arm anchored to said plate, driving means for and meshing with the gear of said vertical shaft, said driving means connected to and extended laterally from said structure, operating means for said driving means operated from said traction unit revolubly mounted at one end on said horizontal shaft and having a driving connection at its other end for said driving means, the said operating means and traction unit having coacting parts to provide for the operation of said operating means by and on the anti-clockwise movement of the traction unit, said structure arranged between the forward end of said plate and said cut regulating unit, said suspension arm being disposed over said traction member, and said traction member being formed in its periphery with a clearance for said arm.

3. In a mobile lawn trimmer a cutter bar, a horizontally disposed rotatable cutter positioned over said bar, a vertically disposed operating shaft for the cutter provided with a gear intermediate its ends, a vertical housing encompassing said gear and the major portion of the length of said shaft and being formed intermediate its ends with a diametrically extending part forming a bearing for said shaft and at each of its ends with bearing means for the shaft, a driving means for and meshing with the gear carried by the shaft, said driving means being connected to said part and extended laterally from said structure, a base plate carrying said bar, and said structure including a rearwardly extending downwardly inclined suspension arm therefor anchored at its lower end to said plate.

4. In a mobile lawn trimmer a cutter bar, a horizontally disposed rotatable cutter positioned over said bar, a vertically disposed operating shaft for the cutter carrying a gear intermediate its ends, a vertical housing encompassing the major portion of the length of said shaft, said structure being formed intermediate its ends with a diametrically extending part forming a bearing for said shaft and at each of its ends with bearing means for the shaft, a driving means for and meshing with the gear carried by the shaft, said driving means being connected to said diametrically disposed part and extended laterally from said structure, a base plate carrying said bar, said structure including a rearwardly extending downwardly inclined suspension arm therefor anchored at its lower end to said plate, and with coacting parts to constitute said structure and being provided at its upper end with adjustable means bearing on the upper end of said shaft to compensate for wear on the cutter.

5. In a mobile lawn trimmer a cutter bar, a horizontally disposed rotatable cutter positioned over said bar, a vertically disposed operating shaft for the cutter provided with a gear intermediate its ends, a vertical housing encompassing said gear and the major portion of the length of said shaft, said housing being formed intermediate its ends with a diametrically extending part forming a bearing for said shaft and at each of its ends with bearing means for the shaft, a driving means for and meshing with the gear carried by the shaft, said driving means being connected to said part and extended laterally from said housing, a base plate carrying said bar, said housing including a rearwardly extending downwardly inclined suspension arm therefor anchored at its lower end to said plate, and a vertically adjustable cut regulating unit positioned below said arm rearwardly of the housing and adjustably connected with and extending through said plate.

6. In a mobile lawn trimmer, a base plate, a cutter bar thereon, a horizontally rotatable cutter unit positioned upon said bar, a bearing structure suspended over said plate for and housing a portion of said unit, a vertically adjustable cut regulating element including a rotatable traction member extending through said plate rearwardly of said unit, means for adjustably connecting said element with said plate, a driving means for said cutter unit connected to and extending laterally from said structure, a rotatable traction unit extended through said plate rearwardly of said member and including a shaft rotatably connected with the plate, an operating means driven from the traction unit for said driving means permanently operatively connected at its forward end to said driving means and having its rear end revolubly mounted on said shaft, and the inner side of the rear end of said operating means and the interior of said traction unit having coacting parts for operating said operating means on the anti-clockwise movement of said traction unit.

7. In a mobile lawn trimmer of that type including a traction unit a vertically adjustable cut regulating unit and a cutter structure driven from the traction unit, the combination of a plate supporting said structure, said plate being formed with a front and a rear opening for the extension therethrough of the cut regulating and traction units respectfully, means mounted on the plate for rotatably supporting the traction unit, and said plate being provided with means for supporting said cut regulating unit in its selected position.

GEORGE B. RANDOLPH.